(12) United States Patent
Sharma et al.

(10) Patent No.: US 10,937,073 B2
(45) Date of Patent: Mar. 2, 2021

(54) PREDICTING DELAY IN A PROCESS

(71) Applicants: Aminish Sharma, Bangalore (IN); Shashi Roshan, Bangalore (IN); Anoop Makwana, Bangalore (IN); Manish Ramesh Shah, Bangalore (IN); Venkata Giri Sirigiri, Bangalore (IN)

(72) Inventors: Aminish Sharma, Bangalore (IN); Shashi Roshan, Bangalore (IN); Anoop Makwana, Bangalore (IN); Manish Ramesh Shah, Bangalore (IN); Venkata Giri Sirigiri, Bangalore (IN)

(73) Assignee: Intuit Inc., Mountain View, CA (US)

( * ) Notice: Subject to any disclaimer, the term of this patent is extended or adjusted under 35 U.S.C. 154(b) by 156 days.

(21) Appl. No.: 16/255,812

(22) Filed: Jan. 23, 2019

(65) Prior Publication Data
US 2020/0234350 A1    Jul. 23, 2020

(51) Int. Cl.
*G06Q 30/04*    (2012.01)
*G06Q 10/10*    (2012.01)
*G06Q 10/06*    (2012.01)

(52) U.S. Cl.
CPC ......... *G06Q 30/04* (2013.01); *G06Q 10/0633* (2013.01); *G06Q 10/06316* (2013.01); *G06Q 10/1091* (2013.01)

(58) Field of Classification Search
None
See application file for complete search history.

(56) References Cited

U.S. PATENT DOCUMENTS

| 8,407,141 B2 * | 3/2013 | Mullen | G06Q 40/02 705/39 |
| 10,142,391 B1 * | 11/2018 | Brisebois | H04L 65/403 |
| 10,157,358 B1 * | 12/2018 | Brisebois | G06Q 10/06393 |
| 10,268,996 B1 * | 4/2019 | Wannamaker | G06Q 30/04 |
| 10,373,140 B1 * | 8/2019 | Chang | G06Q 20/14 |

(Continued)

OTHER PUBLICATIONS

Hu Peiguang, "Predicting and Improving Invoice-to-Cash Collection Through Machine Learning"; Massachusetts Institute of Technology; Jun. 2015 (92 pages).

(Continued)

*Primary Examiner* — Oluseye Iwarere
(74) *Attorney, Agent, or Firm* — Ferguson Braswell Fraser Kubasta PC

(57) ABSTRACT

A method to predict a delay involves receiving an open invoice sent by a company to a customer, extracting, using a programmable interface, a set of company data, a set of customer data, and a set of invoice data from a management application (MA) and the open invoice; refining, using a set of algorithms, the set of company data, the set of customer data, and the set of invoice data into a set of invoice attributes, a set of company features, and a set of customer features; predicting a delay in processing the open invoice using a trained model analyzing the set of company features and the set of customer features; updating, at an expiration of a predetermined timespan, the MA to add the delay to a due date of the open invoice by including the set of company features; and updating, at the expiration of the predetermined timespan, the MA to add the delay in processing the open invoice by including the set of customer features.

20 Claims, 9 Drawing Sheets

(56) References Cited

U.S. PATENT DOCUMENTS

| | | | |
|---|---|---|---|
| 10,395,287 B1* | 8/2019 | Lowell | G06Q 10/06316 |
| 10,607,236 B2* | 3/2020 | Eliscu | G06Q 20/14 |
| 2011/0208649 A1* | 8/2011 | Shader | G06Q 30/04 |
| | | | 705/40 |
| 2014/0122176 A1* | 5/2014 | Olsen | G06F 16/24573 |
| | | | 705/7.31 |
| 2014/0278755 A1* | 9/2014 | Eberl | G06F 16/244 |
| | | | 705/7.29 |
| 2015/0081522 A1* | 3/2015 | Shinar | G06Q 40/025 |
| | | | 705/38 |
| 2015/0142545 A1* | 5/2015 | Ceribelli | G06Q 30/0222 |
| | | | 705/14.23 |
| 2018/0040064 A1* | 2/2018 | Grigg | G06N 5/022 |
| 2019/0205996 A1* | 7/2019 | Are | G06Q 10/04 |
| 2020/0118100 A1* | 4/2020 | Rao | G06N 20/00 |
| 2020/0226503 A1* | 7/2020 | Subramanian | G06K 9/6257 |
| 2020/0265443 A1* | 8/2020 | Shah | G06Q 20/42 |

OTHER PUBLICATIONS

Weikun Hu, "Overdue Invoice Forecasting and Data Mining"; Massachusetts Institute of Technology; Jun. 2016 (67 pages).
Sai Zeng et al., "Using Predictive Analysis to Improve Invoice-to-Cash Collection"; Knowledge Discovery and Data Mining Conference; Las Vegas, Nevada; Aug. 24-27, 2008 (8 pages).

* cited by examiner

PREDICTING DELAY IN A PROCESS

BACKGROUND

Delays are a common occurrence in many processes ranging from invoice payments for a small business to activity over a computer network. Typically, these delays are difficult to predict and thus cause problems for a small business or a network administrator trying to determine a future forecast or schedule.

As an example, an employee of a small business may generate an invoice using a software application that results in the invoice being sent directly to a customer with a due date to submit payment. However, not all customers pay the invoice by the stated due date, potentially causing a cash flow problem for the small business. Determining cash flow based on anticipated payment of invoices by a particular customer or group of customers is critical to a small business owner. Using technology to predict a delay in a process would provide the small business with a tool to reduce the delay in the process and better manage all aspects of the business.

SUMMARY

In general, in one aspect the invention relates to a method comprising receiving an open invoice sent by a company to a customer; extracting, using a programmable interface, a plurality of company data, a plurality of customer data, and a plurality of invoice data from a management application (MA) and the open invoice; refining, using a set of algorithms, the plurality of company data, the plurality of customer data, and the plurality of invoice data into a plurality of invoice attributes, a plurality of company features, and a plurality of customer features, wherein the plurality of company features comprises an overall company paid invoice history and a recent company paid invoice history, wherein the recent company paid invoice history comprises paid invoices related to the company over a predetermined timespan, and wherein the plurality of customer features comprises an overall customer payment history and a recent customer payment history over the predetermined timespan; predicting a delay in processing the open invoice using a trained model analyzing the plurality of company features and the plurality of customer features; updating, at an expiration of the predetermined timespan, the MA to add the delay to a due date of the open invoice based on the plurality of company features; and updating, at the expiration of the predetermined timespan, the MA to add the delay in processing the open invoice based on the plurality of customer features.

In general, in one aspect the invention relates to a system comprising a data repository, a memory coupled to a computer processor, and a process delay predictor executing on the computer processor. The data repository comprising a plurality of sender data, a plurality of requestor data, and a plurality of query data, a plurality of sender features and a plurality of requestor features, a data set comprising feature vectors labeled with a delay in processing the query data, and the feature vector comprising a value for the plurality of sender features and the plurality of requestor features. The process delay predictor executing on the computer processor and using the memory to: receive an open query sent by a company to a requestor; extract the plurality of company data, the plurality of customer data, and the plurality of query data from the data repository using a programmable interface to access a software application; refine, using a set of algorithms, the plurality of sender data, the plurality of requestor data, and the plurality of query data into the plurality of sender features and the plurality of requestor features, wherein the plurality of sender features comprises an overall sender closed query history and a recent sender closed query history, wherein the recent sender closed query history comprises the closed queries related to the sender over a predetermined timespan, and wherein the plurality of requestor features comprises an overall requestor closed query history and a recent requestor closed query history over the predetermined timespan; predict a delay in processing the open query using a trained model analyzing the plurality of sender features and the plurality of requestor features; updating, at an expiration of the predetermined timespan, the application to add the delay to a due date of the open query based on the plurality of sender features; and updating, at the expiration of the predetermined timespan, the application to add the delay in processing the open query based on the plurality of requestor features.

In general, in one aspect the invention relates to a method comprising: receiving an open query sent by a sender to a requestor; extracting, using a programmable interface, a plurality of sender data, a plurality of requestor data, and a plurality of query data from an application and the open query; refining, using a set of algorithms, the plurality of sender data, the plurality of requestor data, and the plurality of query data into a plurality of sender features and a plurality of requestor features, wherein the plurality of sender features comprises an overall sender closed query history and a recent sender closed query history, wherein the recent sender closed query history comprises the closed queries related to the sender over a predetermined timespan, and wherein the plurality of requestor features comprises an overall requestor closed query history and a recent requester closed query history over the predetermined timespan; predicting a delay in processing the open query using a trained model analyzing the plurality of sender features and the plurality of requestor features; updating, at an expiration of the predetermined timespan, the application to add the delay to a due date of the open query based on the plurality of sender features; and updating, at the expiration of the predetermined timespan, the application to add the delay in processing the open query based on the plurality of requestor features.

Other aspects of the invention will be apparent from the following description and the appended claims.

DETAILED DESCRIPTION

Figure 1A:
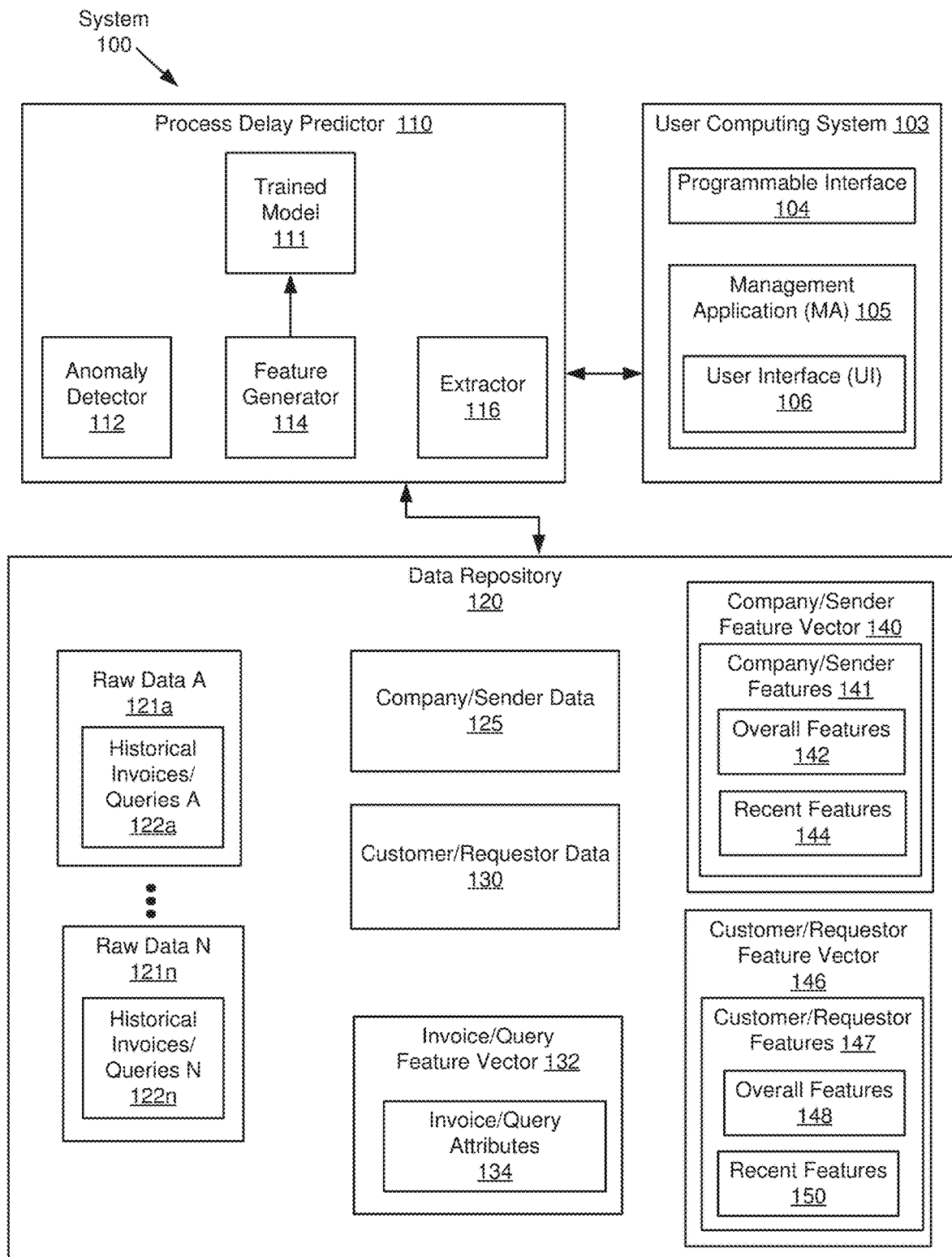
FIG. 1A shows a flow diagram of a system in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a system and method for predicting an expected delay for a process. When a process is unexpectedly delayed, the result is disruption within a business. For example, if the process is the payment of an invoice issued by a small business, then the unexpected delay in payment results in unpredictable cash flow issues for the small business that ultimately could result in business failure. Being able to predict the expected delay in the process, such as payment of an invoice or a network outage, allows a business to adjust its practices to avoid disruption or failure.

A tool that provides prediction of the unexpected delay for a process may be based on historical data from previous users submitting a request to perform the process and the request being completed. The prediction may be based on features generated from the historical data extracted from a management application, such as a financial management application or a network management application. In one or more embodiments, the prediction is performed using a machine learning model trained using features generated from requests and responses extracted from historical data. The features may be based on an aggregation or summary of data associated with requests and responses. In one or more embodiments, the model is based on decision trees. The training data may also include machine events (e.g., extracted from logs tracking computing devices and/or networks).

The tool provides for process delay prediction, which improves timely process completion. As a result of the delay prediction, the manager of the process is able to follow-up when the process is predicted to be late and also able to better plan for and manage the processes based on the anticipated delay. The result of using the tool is a reduction in the average delay in the range of thirty percent based on awareness of and the visibility into the delay. If the process being tracked is collections of invoices, a small business is able to pro-actively follow-up on invoices that are predicted to be late to reduce late payments as well as plan weekly cash flow for the business based on the anticipated delay.

FIG. 1A shows a flow diagram of a system (100) in accordance with one or more embodiments of the present disclosure. As shown in FIG. 1A, the system (100) includes multiple components such as the user computing system (103), a process delay predictor (110) and a data repository (120). Each of these components is described below.

Figure 5A:
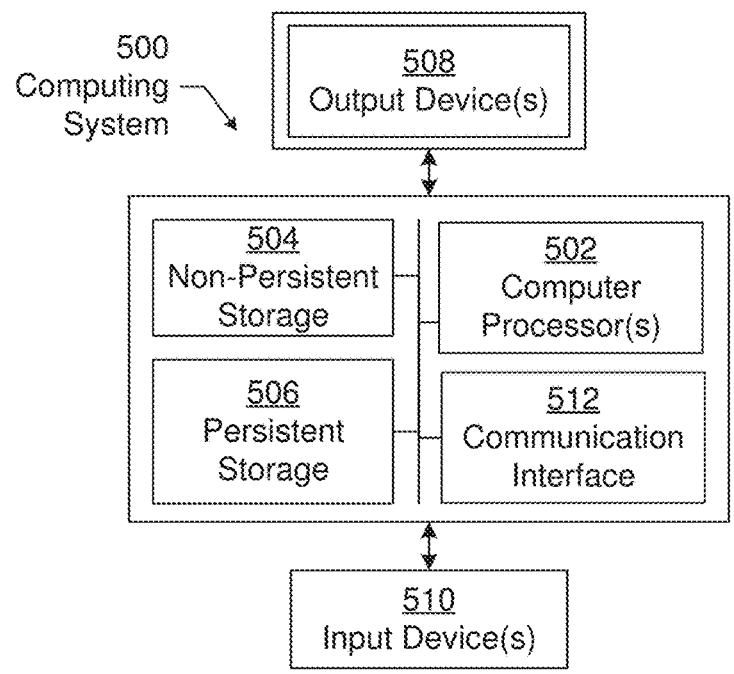
FIG. 5A and FIG. 5B show an example computing system in accordance with one or more embodiments.
Figure 5B:
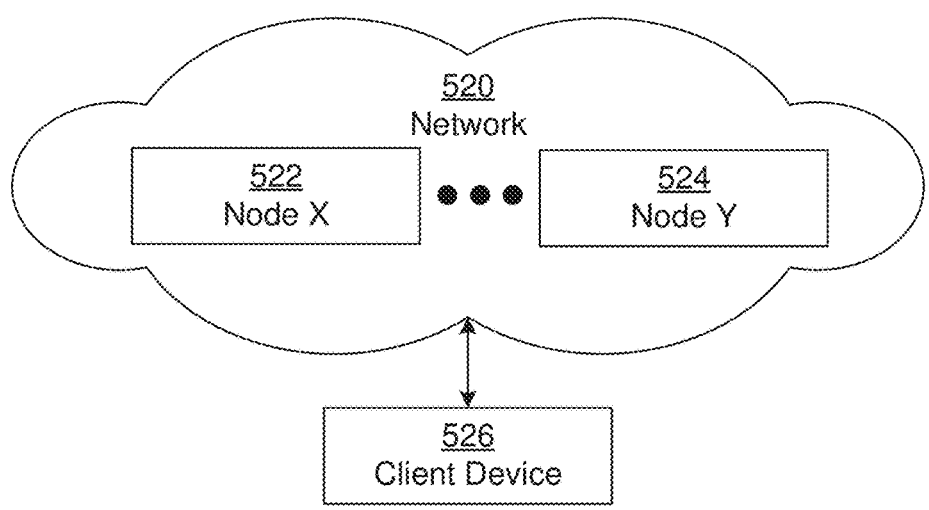

The system (100) includes a user computing system (103). In one or more embodiments, the user computing system (103) provides, to a user, a variety of computing functionality. For example, the computing functionality may include word processing, multimedia processing, financial management, business management, social network connectivity, network management, and/or various other functions that a computing device performs for a user. The user may be a company employee that acts as a sender, a potential sender, or a requestor of services performed by a company (e.g., a client, a customer, etc.) of the user computing system. The user computing system (103) may be a mobile device (e.g., phone, tablet, digital assistant, laptop, etc.) or any other computing device (e.g., desktop, terminal, workstation, etc.) with a computer processor (not shown) and memory (not shown) capable of running computer software. One skilled in the art will appreciate that the user computer system (103) may take the form of the computing system (500) shown in FIG. 5A connected to a network (520) as shown in FIG. 5B.

Continuing with FIG. 1A, the user computing system (103) includes a programmable interface (104) and a management application (MA) (105) in accordance with one or more embodiments of the invention. In one or more embodiments, the programmable interface (104) executes on the computing system and allows access to the exposed functionality of the MA (105). The programmable interface may be a plug-in, an application programming interface (API), or any other type of interface that allows access to the functionality of a software application on the user computing system (103) or across a network. In one or more embodiments, the programmable interface (104) interacts with a cloud service. In one or more embodiments, the programmable interface (104) may access the outside computing system without user intervention. For example, a user may open an application on the user computing system (103) and the programmable interface (104) automatically accesses the outside computing system upon detection of the application opening.

The MA (105), in accordance with one or more embodiments, is a software application written in any programming language that includes executable instructions stored in some sort of memory. The instructions, when executed by one or more processors, enable a device to perform the functions described in accordance with one or more embodiments. In one or more embodiments, the MA (105) is capable of assisting a user with the user's finances or business needs. For example, the MA (105) may be any type of financially-based application such as a tax program, a personal budgeting program, a small business financial program, or any other type of program that assists with finances. The MA (105) may also be a network management tool to allow the business to monitor and control various devices across a network to allow protection from intruders compromising security or device failure.

The user interface (UI) (106) is an interface within the MA (105) for receiving input from a user and transmitting output to the user. For example, the UI (106) may be a graphical user interface or other user interface. The UI (106) may be rendered and displayed within a local desktop software application or the UI (106) may be generated by a remote web server and transmitted to a user's web browser executing locally on a desktop or mobile device. For example, the UI (106) may be an interface of a software application providing the functionality to the user (e.g., a local gaming application, a word processing application, a financial management application, network management application, business management application etc.). In such a scenario, the help menu, popup window, frame, or other portion of the UI (106) may connect to the MA (105) and present output.

Continuing with FIG. 1A, the data repository (120) is any type of storage unit and/or device (e.g., a file system, database, collection of tables, or any other storage mechanism) for storing data. Further, the data repository (120) may include multiple different storage units and/or devices. The multiple different storage units and/or devices may or may not be of the same type or located at the same physical site. The data repository (120) may be accessed online via a cloud service (e.g., Amazon Web Services, Egnyte, Azure, etc.). The data repository (120) includes functionality to store raw data (raw data A (121a), raw data N (121n), company/sender data (125), customer/requestor data (130)), and feature vectors (company/sender feature vector (140) and customer/requestor feature vector (146)) including features (company/sender features (141) and customer/requestor features (147)). Each of these components is described in further detail below.

In one or more embodiments, raw data (raw data A (121a) and raw data N (121n)) is data related to historical queries (or invoices) as well as the requestor (e.g., customer) and sender (e.g., company) respectively. The raw data may be obtained by extracting from the MA (105), such as a financial management application (FMA), network management application, or business management application (BMA). The MA (105) has access to the history of both the requestor and the sender, including query history, project history, client history, and any other business or financial information related to the requestor and sender. Thus, the MA (105) may retrieve previous queries from the sender and requestor, including queries that previously occurred between the sender and requestor and among other clients and companies.

The raw data (raw data A (121a) and raw data N (121n)) may include an open query received by a sender or requestor. In one or more embodiments, the open query may be an invoice, a purchase order, a service request, an approval request, a request for proposal or report, a deposit request, a network request, a database query, a connection request, or an authentication request. The open query may include details such as dates, amounts, terms, or any other information related to an open query. For example, the open query, such as an invoice includes the invoice terms, the invoice amount, the creation date, and the due date.

The raw data may include a closed query received by the sender or requestor. In one or more embodiments, the closed query may be a payment, a product delivery, a service performed, an approval received, a proposal submitted, a report received, a deposit received, query results received, a connection established, or an authentication confirmed/denied. The closed query may include details such as dates and amounts. For example, the closed query, such as a payment may include the total payment amount, the amount completed, and the date the payment was received.

Continuing with the data repository (120), the data repository (120) may also include company/sender data (125) and customer/requestor data (130). Company/sender data (125) and customer/requestor data (130) may be raw data specifically about the company/sender or the customer/requestor. In addition, the company/sender data (125) and customer/requestor data (130) may result from manipulating the raw data into a form that is usable for a model, a calculation, a computer application, or any type of computer function. For example, the company/sender data (125) and customer/requestor data (130) may be the raw data converted into a different file format, such as being converted from an excel spreadsheet .xml format to a .txt format. Further, the company/sender data (125) and customer/requestor data (130) may be verified as accurate and authentic as well as anomalies may be eliminated or reduced.

The data repository (120) may also include feature vectors, such as an invoice/query feature vector (132), a company/sender feature vector (140), and/or a customer/requestor feature vector (146). The feature vectors are vectors that contain features and/or attributes of invoices/queries, companies/senders, and customers/requestors that are in the form to be used by a trained model (111) as shown in FIG. 1A and described below.

The invoice/query feature vector (132) includes invoice/query attributes (134) such as the invoice term, invoice amount, invoice creation date, invoice creation month, due day of the month, due month of the year, invoice due date, whether the invoice is due upon receipt or later, etc. The company/sender feature vector (140) include company/sender features (141). The customer/requestor feature vector (146) includes customer/requestor features (147). Generally, the features (141, 147) are a result of further refinement of the company/sender data (125), customer/requestor data (130), and raw data (121a, 121n) that result in a final form of useable data. The features provide an overall history of a customer/requestor (148) and a company/sender (142) as well as a recent history of the customer/requestor (150) and company/sender (144). The features (141, 147) may be calculated and derived using algorithms. The features (141, 147) may be recent features (144, 150) or overall features (142, 148).

In one or more embodiments, the recent features (144, 150) may include the last query ratio of response duration to term, the last closed query delay, the last closed query response duration, the percentage completions on time for last five or ten queries, percentage of last five or ten queries closed late, the average response delay for the last five or ten queries, and the average response duration for the last five or ten queries. For example, the recent feature (144, 150) may be an aggregation over closed queries, such as an average delay, taken over the previous 2 weeks or the last 10 completed queries. Additionally, the number of previous queries used for the recent features may be adjusted as needed and does not necessarily need to be 5 or 10. The recent features (144, 150) may relate to both the customer/requestor and the company/sender. In one or more embodiments, the recent features (144, 150) may correspond to a singular feature or multiple features.

In one or more embodiments, the overall features (142, 148) relate to the company/sender and customer/requestor respectively and contain the features for the overall timeline of the company/sender and customer/requestor. The overall features (142, 148) may include the percentage of queries completed late, the average response delay, percentage amount of completions on time, average response duration, average ratio of response duration, average term, average query amount, and number of queries raised. For example, the overall feature may be to total number of queries processed by the requestor. In one or more embodiments, the overall features (142, 148) may correspond to a singular feature or multiple features.

Continuing with FIG. 1A, the data repository (120) and user computing system (103) are communicatively linked to the delay predictor (110). The delay predictor (110) may be included within a computing system containing components used to predict a delay. In one or more embodiments, the delay predictor (110) may include a number of servers (e.g., racked servers) connected by a network (e.g., a local area network (LAN) or a wide area network (WAN)) to each other in a cluster (e.g., a load-balancing cluster, a Hadoop cluster, a Beowulf cluster, etc.) or other distributed system which may run website software (e.g., web-server software, database software, etc.) and distributed-computing and/or cloud software, such as Apache Spark™, Map-Reduce, Google File System, Hadoop, Hadoop File System, Hadoop YARN, Hive, Dremel, CloudBase, Memcached, Redis, etc., which may be deployed alone or in combination. Additionally, or alternatively, the delay predictor may be hosted wholly or partially in a (1) public cloud; and/or (2) a private cloud. In one or more embodiments, the cloud resources may serve as a platform-as-a-service (PaaS) or an infrastructure-as-a-service (IaaS).

In one or more embodiments, the delay predictor (110) includes an anomaly detector (112). The anomaly detector (112) may be a learning model trained to detect an anomaly in the raw data, company data, and/or customer data. In one or more embodiments, the criteria for detecting anomalies are pre-defined by the delay predictor (110). The anomaly detector (112) may include functionality to remove anomalous closed queries from the data repository (120). For example, an open query may have a due date, yet the open query was cancelled and never completed. The anomaly detector (112) recognizes that the open query was cancelled and removes it from the data repository (120) so the delay date between the open query and closed query is not affected.

In one or more embodiments, the delay predictor (110) includes a fetcher (118). The fetcher (118) retrieves the data, such as raw data, company data, and/or customer data from the data repository (120) for the delay predictor (110) to use. In one or more embodiments, the fetcher (118) may retrieve open queries from a MA (105) and send the open queries to the data repository (120) to be stored as raw data. For example, the fetcher (118) may extract data regarding an open query (e.g., invoice) and a closed query (e.g., payment) between a sender (e.g., company) and a requestor (e.g., customer) to assist in training a model.

Continuing with FIG. 1A, in one or more embodiments, the feature generator (114) may be implemented in hardware (e.g., circuitry), software, firmware, and/or any combination thereof. The feature generator (114) uses the open queries retrieved by the fetcher (118) to generate the features (141, 147) used in the trained model (111). The features (141, 147) may be generated using a pre-defined algorithm by the feature generator (114). For example, the feature generator (114) may use a formula to calculate the percentage of open queries completed late by a requestor/customer. In one or more embodiments, the features (141, 147) generated by the feature generator (114) may be stored in the data repository (120).

In one or more embodiments, the delay predictor (110) includes a trained model (111). In one or more embodiments, the trained model (111) is trained to predict a delay in the closed query (e.g., payment) to an open query from a requestor/customer. The trained model (111) may be trained using a history of closed queries of senders/companies, requestors/customers, or any other user that has data available. The trained model (111) may be a trained learning model such as a random forest regressor, neural network regressor, linear regression model, SGD regressor, lasso regressor, gradient boosting regressor, bagging regressor, ada boost regressor, ridge regressor, elastic net regressor, or NuSVR regressor. For example, the trained model (111) may be a random forest regressor (e.g., decision tree) that is trained using vast amounts of data made available by the MA (105). The trained model (111) may receive input from the feature generator (114) in the form of features (141, 147).

In one or more embodiments, the trained model (111) is trained using a training set of raw data (121a and 121n) and other data, such as company/sender data (125), customer/requestor data (130), etc. After the training, the performance of the trained model (111) is tested with a validation set to confirm the accuracy of the trained model (111). In one or more embodiments, the training set and validation set predict a classifier score, a mean absolute error, and a median absolute error. For example, the training data set may calculate a classifier score (r2) of 0.57, a mean absolute error of 16.19 days, and a median absolute error of 8.45 days. The validation set may then calculate a classifier score (r2) of 0.41, a mean absolute error of 18.32, and a median absolute error of 9.07 days.

Figure 1B:
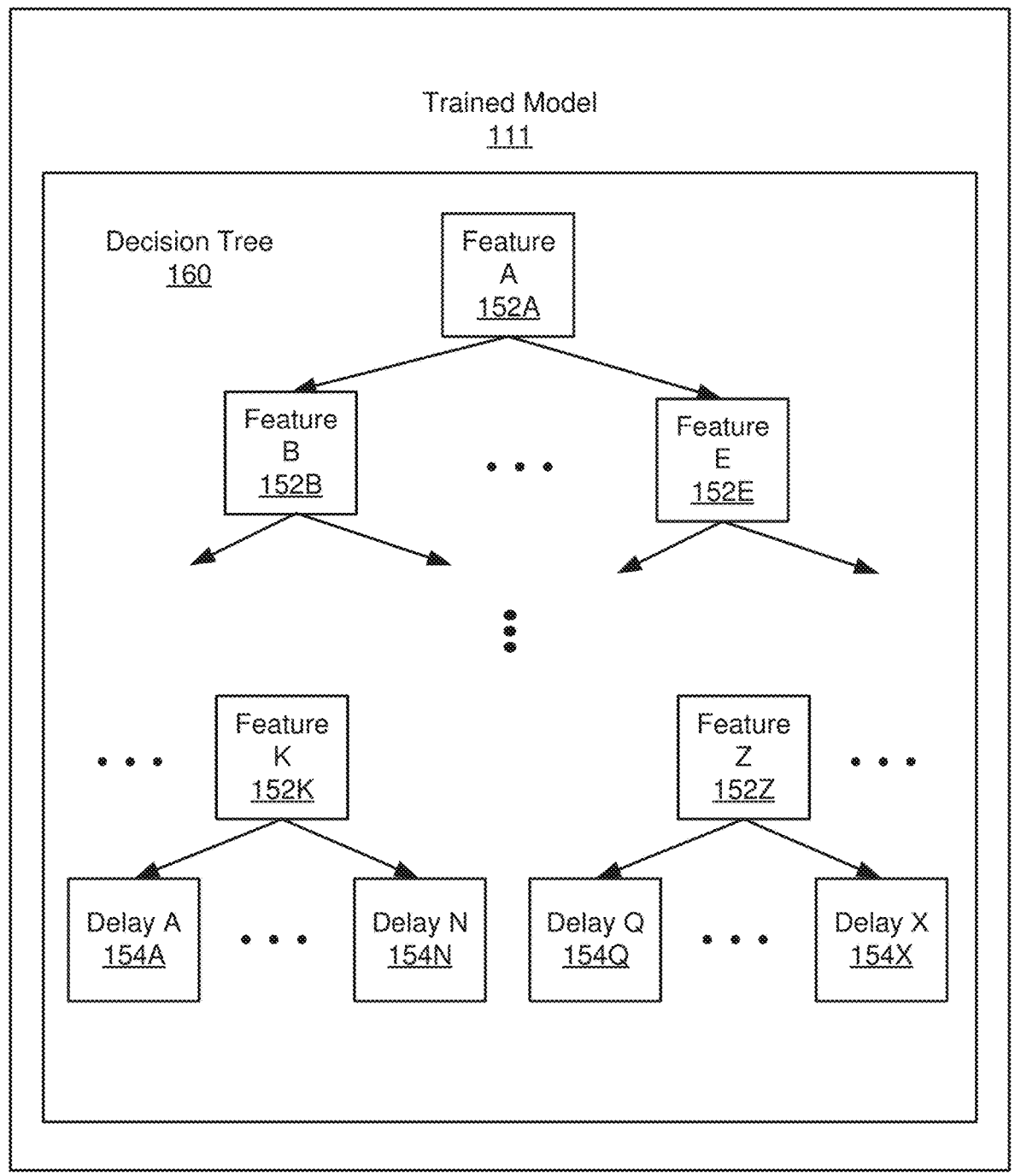
FIG. 1B shows a decision tree in accordance with one or more embodiments.

Turning to FIG. 1B, in one or more embodiments, the trained model (111) includes functionality to use machine learning techniques (e.g., using the MLlib machine learning library from Apache Spark™ or systems with similar functionality) to generate a decision tree (160). In one or more embodiments, the trained model (111) may be implemented using Python libraries and toolkits, such as, for example, Numpy, SciPy, Pandas, and/or Scikit-learn.

In one or more embodiments, the trained model (111) is a decision tree (160) whose internal nodes correspond to features (e.g., feature A (132A), feature B (132B), feature E (132E), feature K (132K), and feature Z (132Z)). The features may correspond to recent customer/requestor features (150), recent company/sender features (144), overall customer/requestor features (148), and overall company/sender features (142) as described in FIG. 1A.

Returning to FIG. 1B, the trained model (111) includes functionality to predict a delay (e.g., delay A (154A), delay N (154N), delay Q (154Q), and delay X (154X)) of an open query from a user in accordance with one or more embodiments. The trained model (111) may learn the correlation of features (e.g., feature A (132A), feature B (132B), feature E (132E), feature K (132K), and feature Z (132Z)) to delay (e.g., delay A (154A), delay N (154N), delay Q (154Q), and delay X (154X)) based on a supervised training data set. In one or more embodiments, each element of the training data set is a vector of feature values labeled with an outcome. The branches (e.g., edges) of the decision tree (152) may represent values of the features.

In one or more embodiments, a leaf node of the decision tree (152) represents a possible delay (e.g., delay A (154A), delay N (154N), delay Q (154Q), and delay X (154X)) of an open query based on a path through the decision tree (152) to the leaf node. A leaf node of the decision tree (152) may also represent a probability associated with the delay.

In one or more embodiments, a path through the decision tree (152) includes a series of branches terminating at a leaf node. The series of branches may correspond to the values of a feature vector, where the feature vector assigns a value to each of a set of features. Each path may classify the feature values corresponding to the branches on the path as a predicted delay of an event (e.g., a delay of an event at a leaf node) with a corresponding probability. In one or more embodiments, the probability associated with a leaf node is the ratio of the successful outcomes divided by the total number of outcomes in the training data set at the branch of the decision tree (152) terminating at the leaf node. For example, one leaf node may represent an outcome indicating the occurrence of a delay with a probability of 0.3. Another leaf node may represent an outcome indicating the non-occurrence of a delay with a probability of 0.7. The trained model (111) may learn the probabilities associated with various delays based on supervised training data.

While FIG. 1A and FIG. 1B show a configuration of components, other configurations and techniques may be used without departing from the scope of the invention. For example, various components may be combined to create a single component. As another example, the functionality performed by a single component may be performed by multiple components.

Figure 2:
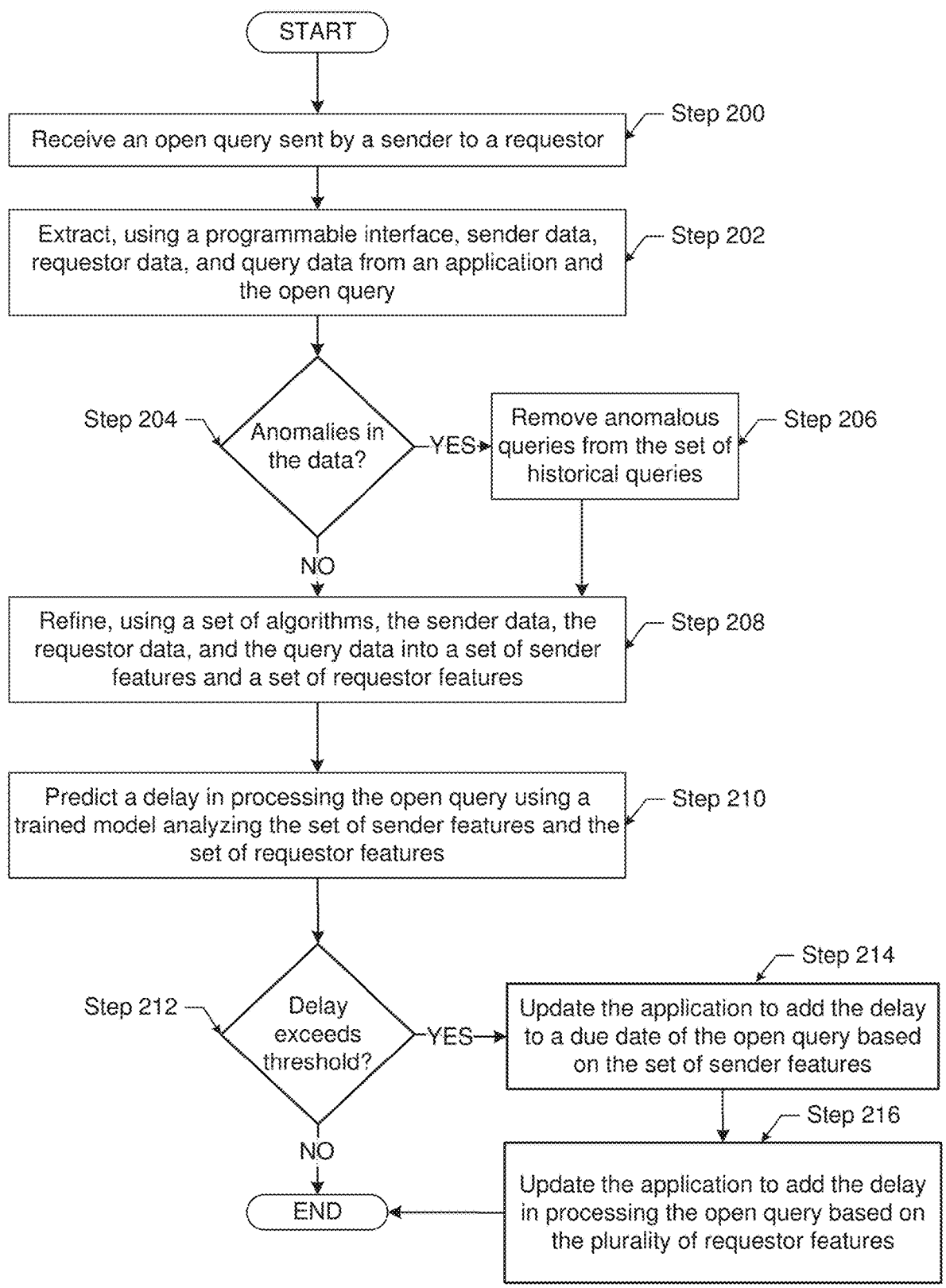
FIG. 2, FIG. 3A, and FIG. 3B depict flow charts of a method in accordance with one or more embodiments.

FIG. 2 shows a flowchart in accordance with one or more embodiments of the present disclosure. The flowchart of FIG. 2 depicts a method for predicting a delay. The process may be performed by one or more components of the system (100) discussed above in reference to FIG. 1A and using the decision tree discussed in relation to FIG. 1B. In one or more embodiments, one or more of the steps shown in FIG. 2 may be omitted, repeated, supplemented, and/or performed in a different order than the order shown in FIG. 2. Accordingly, the scope of the present disclosure should not be considered limited to the specific arrangement of steps shown in FIG. 2.

In Step 200, an open query (such as an invoice) is sent by a sender (such as a company) to a requestor (such as a customer) is received. The open query may be submitted to the requestor through a management application (MA) and may include parameters such as a total amount due, query details, and a due date. In one or more embodiments, the requestor/customer and the sender/company use the MA.

In Step 202, sender data, requestor data, and query data are extracted from an application (such as the MA) and the open query. In one or more embodiments, the set of sender data includes historical data and the most recent data of the sender/company. The set of sender data is extracted from the MA and stored in a data repository. The set of sender data may include closed queries sent from the senders (such as the company) to requestors (such as the customer). In one or more embodiments, the set of requestor data includes historical data and the most recent data related to the requestor/customer. The set of requestor data is extracted from the MA and stored in a data repository. Further, the set of requestor data may include open queries (such as invoices) sent to the requestor (such as the customer) from senders (such as a company) as well as open queries (such as invoices) that the requestor has closed (i.e., paid). The query data may include data extracted from the open query (such as an invoice), such as the details of the process, the invoice amount, the term of the process, the invoice term, the due date of the process, whether the invoice is due upon receipt, the creation date of the process, the due day of the month, the due month of the year, the creation day, the creation month, etc.

In Step 204, a decision is made whether anomalies are detected in the data extracted in Step 202. If anomalies are detected, the method continues to Step 206; however, if no anomalies are detected, the method proceeds directly to Step 208.

In Step 206, anomalous data from the sets of sender data, requestor data, and query data are removed. An anomaly detector determines which data contains anomalies using a set of rules determined by the data infrastructure. The set of rules may be determined by an outside user or owner of the MA. For example, a rule may be generated to remove all cancelled open queries or closed queries.

In Step 208, the sender data, the requestor data, and the query data are refined (using a set of algorithms) into a set of sender features and a set of requestor features. The features may be generated through calculations and algorithms that further refine the send data, the query date, and requestor data. The calculations may use information from the open queries and closed queries (such as due dates, response amounts, terms of response, response dates, and any other relevant information). In one example, the percentage of queries completed late by the sender is calculated. The total number of late queries by the sender is divided by the total number of queries by the sender to produce the percentage of queries completed late.

In one or more embodiments, the calculations are performed using the most recent open queries and closed queries by the sender/company and requestor/customer. The most recent queries are pre-determined by the data infrastructure and may be any number of previous recent queries (e.g., 5 or 10). In one or more embodiments, the number of previous recent queries may be changed by an outside user or owner of the MA. In one or more embodiments, the most recent queries are the open queries that occur over a certain time span. For example, the recent queries may include all queries that occurred in the past week (7 days), month (28, 30, or 31 days), or quarter (120 days).

In Step 210, a delay is predicted regarding processing the open query using a trained model analyzing the set of sender features and the set of requestor features. For example, the trained model may be a decision tree that calculates a probability of each feature and continues down a branching path to the next set of features until the trained model determines the delay. At each level of the decision tree, the probability for each feature determines the path that the decision tree takes. In one or more embodiments, the delay takes into account both the recent features and overall features. In one or more embodiments, the recent features are given a higher weight in the decision tree since the recent features show a more current state of the sender/company and requestor/customer. By utilizing the recent and overall features instead of raw data, the trained model produces a delay that provide an accurate timing to when a request might be completed.

In Step 212, a decision is made to determine whether the delay exceeds a threshold. The threshold may be determined by a user or owner of the MA. For example, the threshold may be 7 days. In one or more embodiments, the user determines the threshold using the configurable settings of the MA. The user may require a stricter or more lenient threshold depending on the particular process being managed. If the delay does not exceed the threshold, the process ends. If the delay does exceed a threshold, the method moves to Step 214.

In Step 214, the MA is updated to add the predicted delay to a due date of the open query based on the sender features in accordance with embodiments of the invention. In particular, a graphical user interface (GUI) within the MA may be updated to reflect the delay based on the company/sender features.

In Step 216, the MA is updated to add the predicted delay to a due date of the open query based on the requestor features in accordance with embodiments of the invention. In particular, a GUI within the MA may be updated to reflect the delay based on the customer/requestor features.

Based upon the update in Step 214 or 216, a notification of the delay may be sent to/from the MA when the delay exceeds a pre-determined threshold. The notification may be in the form of a pop-up notification on a mobile device, an email, a text message, a warning displayed on the GUI, or any other method of notification. For example, when the company/sender or the customer/requestor opens the management application, the GUI may immediately be notified about the delay via a pop-up message within the GUI.

Figure 3A:
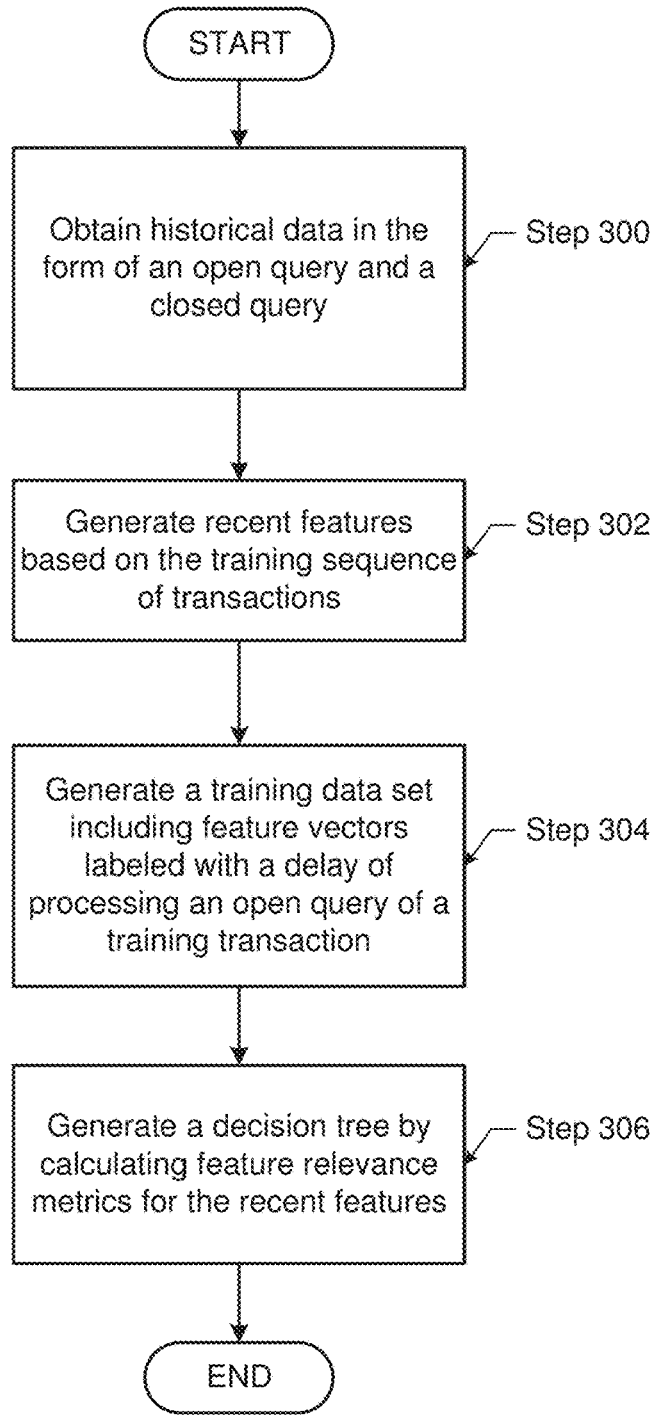

FIG. 3A shows a flowchart in accordance with one or more embodiments of the present disclosure. The flowchart of FIG. 3A depicts a method for training a model, such as the training model described in FIG. 1A, FIG. 1B, and FIG. 2. In one or more embodiments, one or more of the steps shown in FIG. 3A may be omitted, repeated, supplemented, and/or performed in a different order than the order shown in FIG. 3A. Accordingly, the scope of the present disclosure should not be considered limited to the specific arrangement of steps shown in FIG. 3A.

In Step 300, historical data is obtained in the form of open queries and closed queries. The historical data may be retrieved from applications such as a management application, a financial management application, a network management application, or a business management application. The historical data is raw data that has yet to have been processed by the data infrastructure. The open queries and closed queries include initiation dates or times, amounts, due dates, terms, completion dates, and other information related to the open queries and closed queries. From the open queries and closed queries, a delay may be calculated based on the difference in the due date or time and the completion date or time.

In Step 302, the recent features are generated based on a training sequence of data. The training sequence of data is based on the historical data in the form of open queries and closed queries. The recent features are generated through multiple calculations and algorithms designed to process the raw data into a form suitable for a model. In one or more embodiments, the recent features represent an aggregation or summary of data associated with the open queries and closed queries. The recent feature may represent a feature vector (as described above) of event-related data that is consumable by a predictive machine learning. For example, the recent feature may be the last request ratio of response duration to term, the last completed request delay, the last completed request response duration, the percentage amount completed on time for last five or ten requests, percentage of last five or ten requests completed late, the average response delay for the last five or ten requests, and the average response duration for the last five or ten requests. In one or more embodiments, the feature generator includes functionality to generate recent features based on querying a collection of requests (open queries) and responses (closed queries).

In Step 304, a training data set is generated using the recent features. The training data set may include recent feature vectors each labeled with an outcome of the historical data, such as a delay to the response (closed query). Each feature vector may include a value for each of the recent features.

In Step 306, internal nodes, branches, and leaf nodes are added to a decision tree by calculating, using the training data set, feature relevance metrics for the recent features. The internal nodes may correspond to recent or overall features. The branches may correspond to the values of the recent or overall features. Each leaf node may correspond to a delay from the historical responses and requests. The leaf node may also represent a probability associated with the outcome.

In one or more embodiments, the decision tree is generated by adding a series of internal nodes each corresponding to a recent or overall feature. Branches may be added to the decision tree corresponding to the values of the feature present in the training data set. Each internal node may "split" the training data set into subsets based on the values of the corresponding feature, where each branch may correspond to one or more feature values.

In one or more embodiments, at each splitting (e.g., branching) point in the decision tree, an internal node is added corresponding to the feature that is most relevant to the outcome of the delay based on the training data set (see, for example, Quinlan, J. R., (1986). Induction of Decision Trees. Machine Learning 1: 81-106. Kluwer Academic Publishers). Feature relevance may be determined by a feature relevance metric based on the information gain of the feature relative to the outcomes of the requested events in the training data set.

The information gain of the feature may be calculated based on the difference between an information content measure at a current node of the decision tree (e.g., before adding a new internal node corresponding to the feature) and the averaged information content measures corresponding to the child nodes connected to the current node. In one or more embodiments, the information content measure may be based on the information theory concept of entropy, where greater entropy corresponds to greater information content. Alternatively, the feature relevance metric may be based on a gain ratio (e.g., which also may be based on entropy).

The information gain may be used to determine which feature in a set of feature vectors in training data is most useful for discriminating between outcomes. The information gain of a feature may be calculated as the difference between the entropy of the current node and the weighted sum of the entropies of the child nodes of the current node. The entropy at a node may be calculated according to the following formula:

$$\text{Entropy} = \Sigma_i - p_i * \log_2 p_i$$

where $p_i$ is the probability of outcome i (e.g., where outcome i is either success or failure), calculated as the proportion of feature vectors labeled with the corresponding outcome in the training data subset at the node.

Figure 3B:
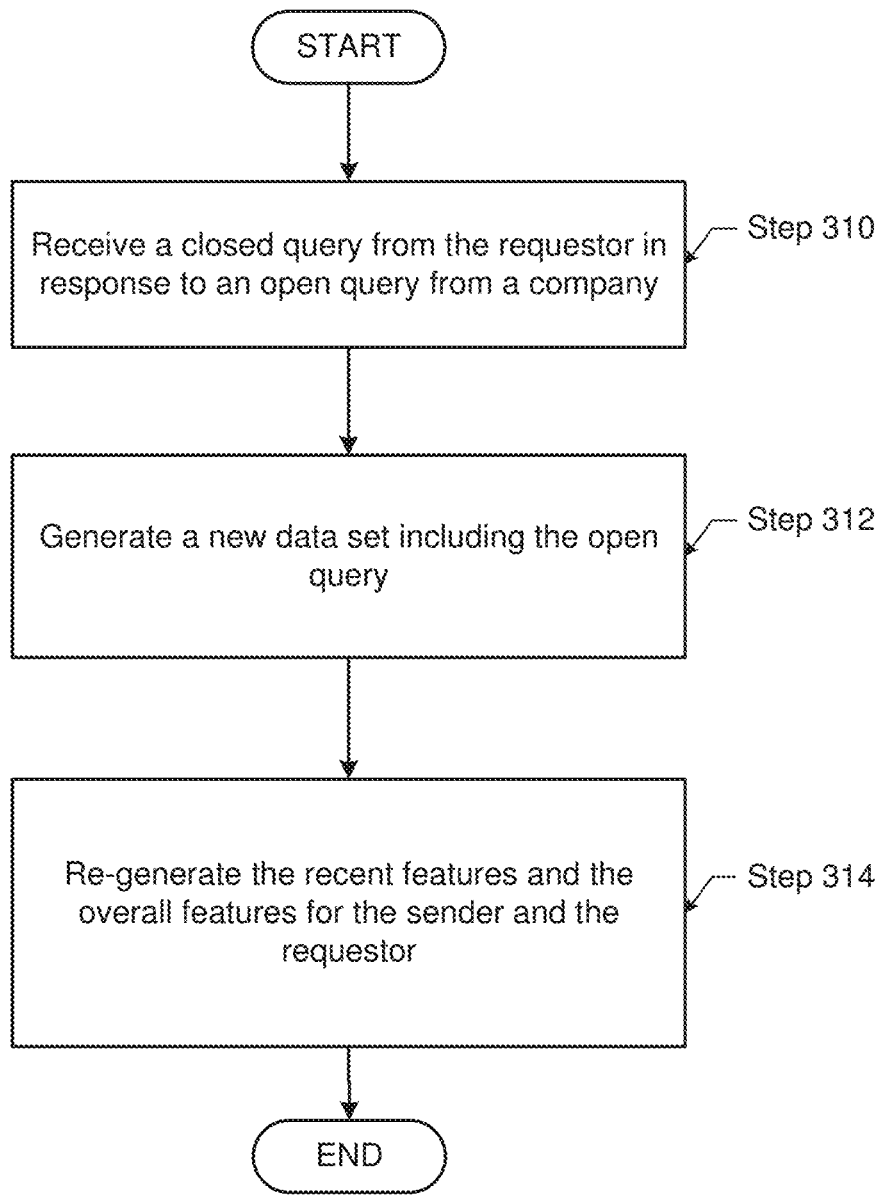

FIG. 3B shows a flowchart in accordance with one or more embodiments of the present disclosure. The flowchart of FIG. 3B depicts a method for updating the recent features of the model, such as the recent features described in FIG. 1A, FIG. 1B, and FIG. 2. In one or more embodiments, one or more of the steps shown in FIG. 3B may be omitted, repeated, supplemented, and/or performed in a different order than the order shown in FIG. 3B. Accordingly, the scope of the present disclosure should not be considered limited to the specific arrangement of steps shown in FIG. 3B.

In Step 310, a closed query (from a company/sender) to an open query (such as an invoice) from a customer/requestor is received. The closed query may be completed on time or may be delayed. In one or more embodiments, the closed query is tracked and received through a MA.

In Step 312, a new data set that includes the open query is generated. The new data set may be stored in a data repository. The new data set includes all information related to the open query and closed query, such as a due date or time, a completion date, an amount, and a delay. The new data may be stored in the data repository within the invoice/query feature vector (132 in FIG. 1A).

In Step 314, the recent features and overall features are re-generated for the company/sender and customer/requestor. The feature generator receives the new data set as an input and generates updated features using the information from the new data set. The feature generator may update the recent and overall features within the feature vectors after each new data set is received. In one or more embodiments, the feature generator updates the recent and overall features at a pre-determined date. For example, the feature generator may be programmed to update once a week.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

The following example is for explanatory purposes only and not intended to limit the scope of the invention. While these examples detail invoices and payments as the open query and closed query respectively, the open query and closed query should not be limited to these examples. For example, the open query may be a purchase order, service request, approval request, a request for proposal or report, a deposit request, a database query, a network request, a connection request, or an authentication request. The closed query may be product delivery, a service performed, an approval received, a proposal submitted, a report received, a deposit received, query results received, a network resolution, a connection established, or an authentication confirmed/denied.

Figure 4A:
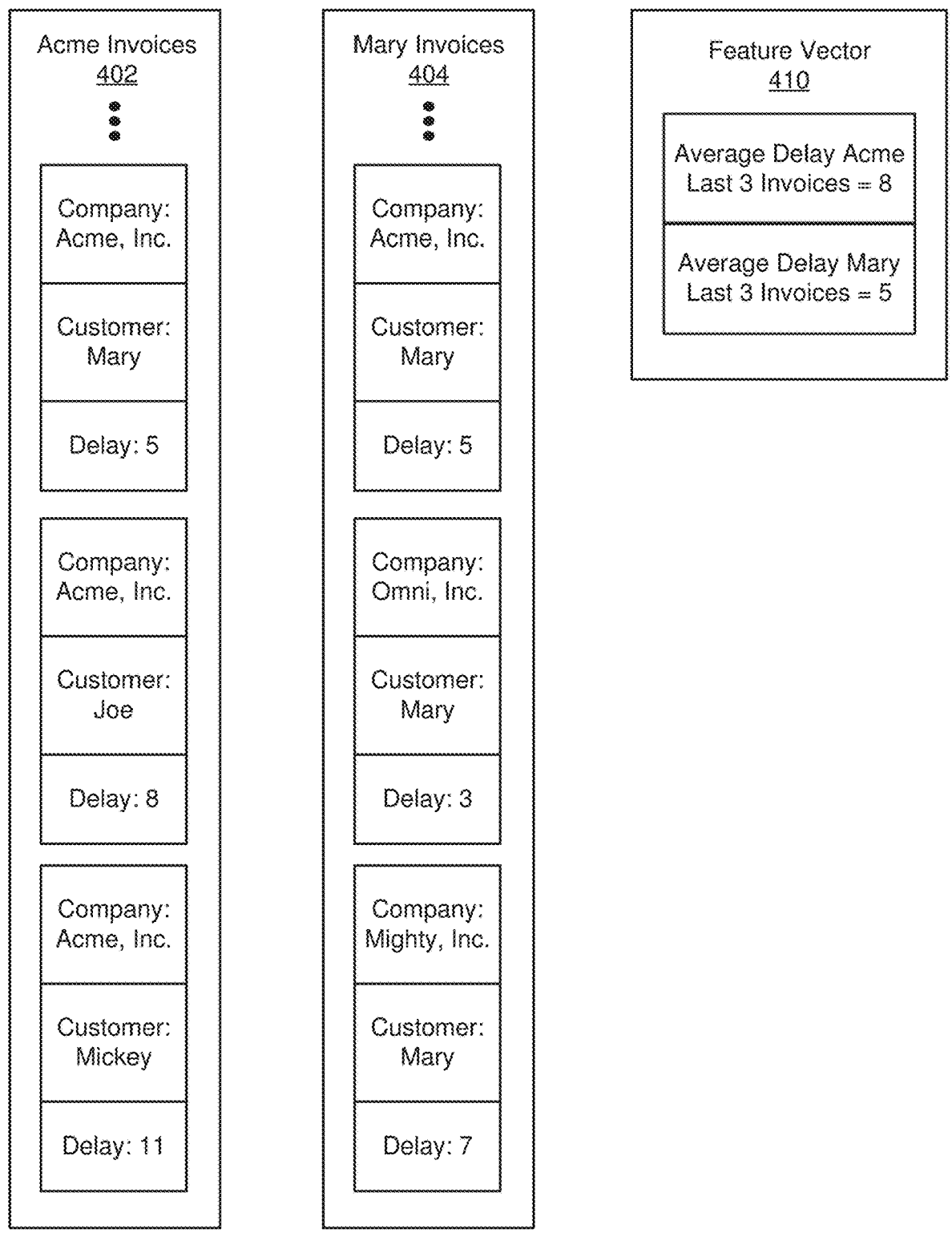
FIG. 4A shows an example in accordance with one or more embodiments.

FIG. 4A shows an example in accordance with one or more embodiments. A list of the three most recent invoices are shown for Acme, Inc. (402) and Mary (404). The list of recent invoices includes the most recent transaction between Acme, Inc., the company, and Mary, the customer. The invoices show the company, customer, and delay for each transaction. The delay represents the time between the due date of an invoice (open query) and the payment of the invoice (closed query). Acme, Inc. and Mary's transaction had a delay in the invoice payment of 5 days. Simply put, Mary was late to pay the invoice by 5 days. Two other invoices are shown for Acme, Inc. between the customers Joe and Mickey. In all 3 invoices, Acme, Inc. is the company sending the invoice to the customers. The invoice between Acme, Inc. and Joe has a delay of 8 days while the invoice between Acme, Inc. and Mickey has a delay of 11 days. Simply put, Joe was 8 days late paying Acme, Inc. and Mickey was 11 days late paying Acme, Inc.

Mary has two invoices between Omni, Inc. and Mighty, Inc. In both invoices, Mary is the customer and owes a payment to the company. Mary was late in paying her invoice to Omni, Inc. by 3 days as represented by the delay of 3 days. Mary was also late in paying her invoice to Mighty Inc. by 7 days as represented by the delay of 7 days.

A feature vector (410) is calculated using the average delays of the 3 recent invoices for Acme, Inc. and Mary. Acme, Inc. has a delay of 5, 8, and 11 days on the invoices while Mary has a delay of 5, 3, and 7 days on her invoices. These results in an average delay of 8 days for Acme, Inc. and an average delay of 5 days for Mary. The feature vector may be stored as a recent feature in a data repository to be used for a trained model in determining future delays for Acme, Inc. and Mary.

Figure 4B:
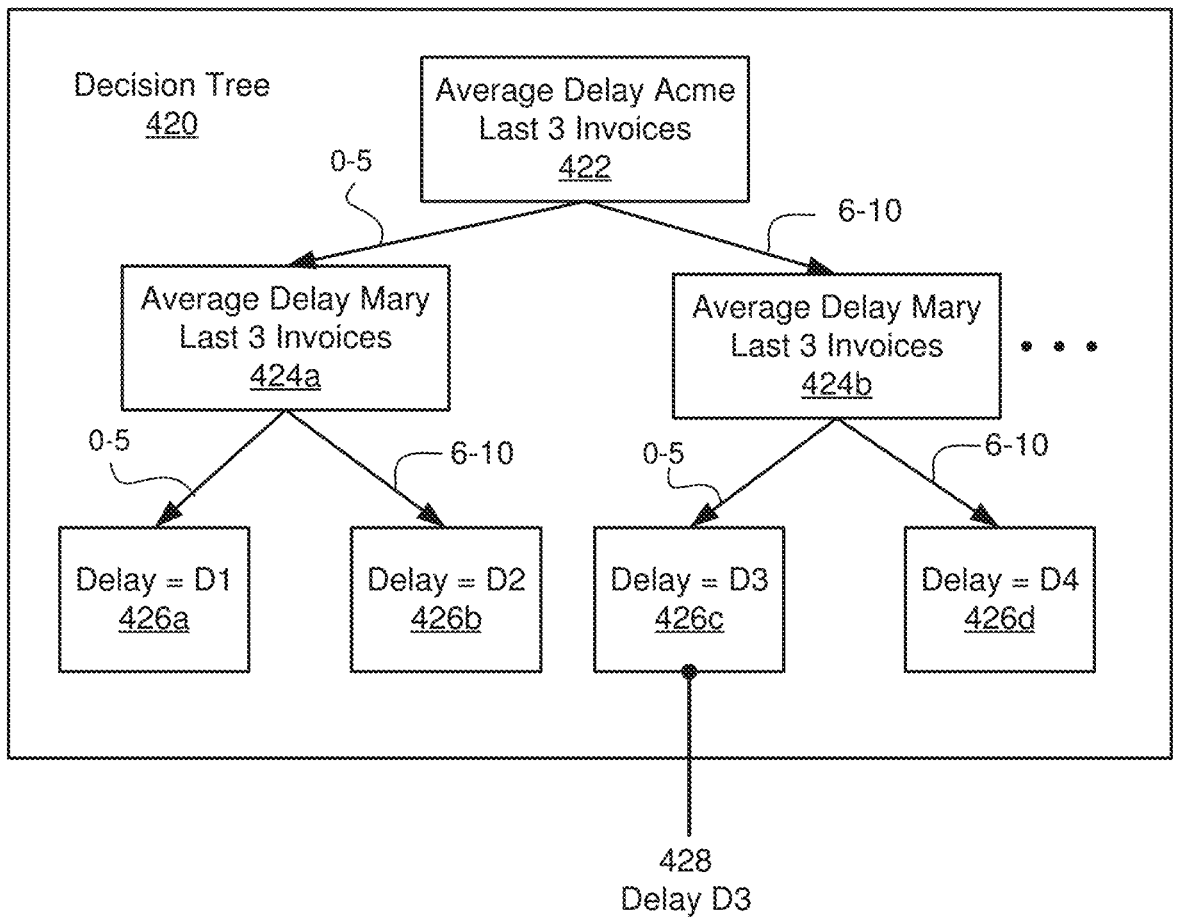
FIG. 4B shows an example decision tree in accordance with one or more embodiments.

FIG. 4B illustrates the decision tree (420) which uses the feature vectors calculated in FIG. 4A. The decision tree (420) includes an internal root node corresponding to a "average delay Acme Last 3 Invoices" feature (422), and internal nodes corresponding to a "average delay Mary last 3 invoices" feature (424a, 424b). Each branch of the decision tree (420) corresponds to a value of the feature (422, 424a, 424b) corresponding to the internal node above the branch point. The decision tree (420) also includes leaf nodes corresponding to the delay (426a, 426b, 426c, 426d) of the requested event.

As described previously, the internal nodes of the decision tree (420) are ordered by the relevance of their corresponding features, based on the training data set. That is, the "average delay Acme last 3 invoices" feature (422) is the most relevant feature, followed by the "average delay Mary last 3 invoices" feature (424a, 424b). As described previously, feature relevance is determined by a feature relevance metric based on the information gain of the feature relative to the outcome of the requested events in the training data set. As described below, the decision tree (420), once generated, may be used to predict the outcome of the requested event, where the prediction is based on traversing a path through the decision tree using a feature vector generated from actual events.

A prediction based on traversing a path through the decision tree (420) using the feature vectors calculated in FIG. 4A. The path begins at the root node, which corresponds to the "average delay Acme last 3 invoices" feature (422) and follows the right-hand branch because the "average delay Acme last 3 invoices" feature vector is 8. Then, the path follows the left-hand branch at the internal node corresponding to the "average delay Mary last 3 invoices" feature (424b), because the "average delay Mary last 3 invoices" feature vector is 5. The path then terminates on a leaf node corresponding to a "Delay=D3" outcome (426c). A notification is then displayed, via the GUI, to the user regarding the delay (428). The notification includes a list of the features corresponding to the path, to provide additional information regarding the prediction that may be useful to the user in future requests.

Figure 4C:
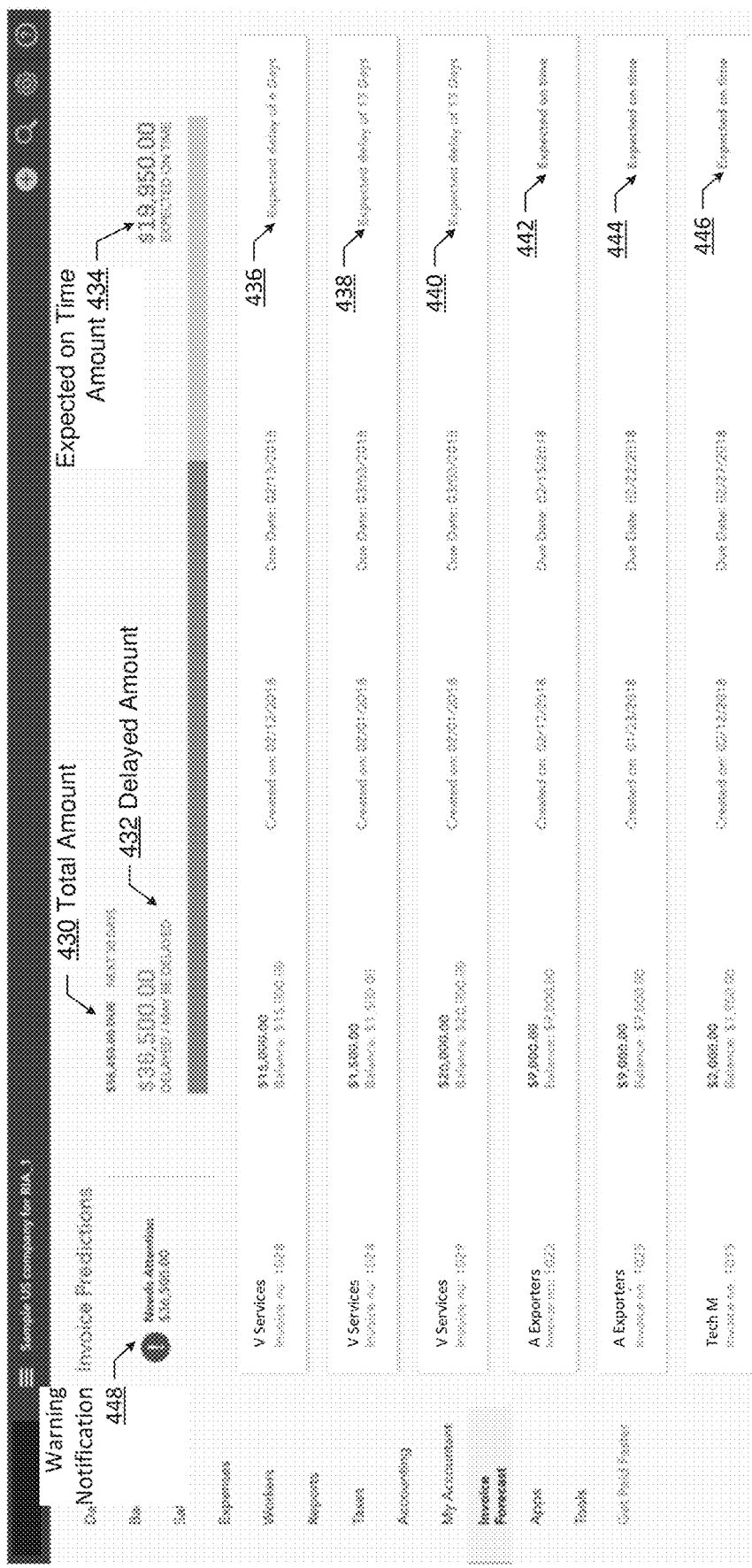
FIG. 4C shows an example graphical user interface in accordance with one or more embodiments.

FIG. 4C shows an example GUI in accordance with one or more embodiments. The user interface shows an invoice forecast for a company expecting multiple payments from multiple customers. At the top of the GUI, a total amount (430) of $56,450.00 is due in the next 30 days. The total amount (430) is displayed in a horizontal bar graph and divided into two sections, a delayed amount (432) and an expected on time amount (434). The delayed amount (432) is the portion of the total amount (430) that is predicted not to be received on time. In this example, the delayed amount (432) is predicted to be $36,500.00. The remaining amount is the amount expected to be received on time (434). In this example, the amount expected to be received on time is $19,950.00. Additionally, a warning notification (448) is bolded with a symbol and colored lettering to bring attention to the user that a certain amount of cash is expected to be delayed.

The GUI displays six invoices that are due in the next 30 days. Three of the invoices from the customer "V Services" are expected to be delayed. One is expected to be delayed 6 days (436), the second is expected to be delayed 13 days (438), and the third is also expected to be delayed 13 days (440). The delays are calculated using a trained model as discussed in FIG. 4A. The expected delays are highlighted to bring attention to the user. The remaining three invoices from "A Exporters" and "Tech M" are expected to be paid on time (442, 444, and 446). While not shown in the example, an invoice may also be predicted to be paid early and an "expected early payment" message appears showing the number of days before the due date.

In one or more embodiments, the GUI is constantly updated in an iterative manner to continually update the information within the GUI and use the updated information to update the feature vectors to feed back into the model resulting in improved delay prediction for processes.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIG. 5A and FIG. 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a GUI on the user device. Data may be submitted via the graphical user interface by a user selecting one or more GUI widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving an open invoice sent by a company to a customer;
extracting, using a programmable interface, a plurality of company data, a plurality of customer data, and a plurality of invoice data from a management application (MA) and the open invoice;
refining, using a set of algorithms, the plurality of company data, the plurality of customer data, and the plurality of invoice data into a plurality of invoice attributes, a plurality of company features, and a plurality of customer features,
wherein the plurality of company features comprises an overall company paid invoice history and a recent company paid invoice history, wherein the recent company paid invoice history comprises paid invoices related to the company over a predetermined timespan, and
wherein the plurality of customer features comprises an overall customer payment history and a recent customer payment history over the predetermined timespan;
predicting a delay in processing the open invoice using a trained model analyzing the plurality of company features and the plurality of customer features,
wherein the trained model individually considers the overall company paid invoice history, the recent company paid invoice history, the overall customer payment history, and the recent customer payment history;
updating, at an expiration of the predetermined timespan, the MA to add the delay to a due date of the open invoice based on the plurality of company features; and
updating, at the expiration of the predetermined timespan, the MA to add the delay in processing the open invoice based on the plurality of customer features.

2. The method of claim 1, wherein the trained model comprises a set of algorithms and is formed by adding, using the plurality of company features and the plurality of customer features, to a decision tree:
internal nodes corresponding to a subset of the plurality of company features and a subset of the plurality of customer features,
branches corresponding to values of the subset, and
leaf nodes, each corresponding to the delay in processing the open invoice.

3. The method of claim 1, further comprising:
obtaining a training sequence of transactions, wherein the training sequence of transactions comprises historical data including the open invoice, the paid invoice, and the delay;
generating a plurality of recent features based on a sub-sequence of transactions resulting at a completion of the training sequence of transactions;
generating, using the plurality of recent features, a training data set comprising a plurality of feature vectors labeled with the delay of the paid invoice of one of the training sequence of transactions, wherein each feature vector comprises a value for each of the plurality of recent features; and
generating a decision tree by calculating, using the training data set, a plurality of feature relevance metrics for the plurality of recent features.

4. A system comprising:
a data repository comprising:
   a plurality of sender data, a plurality of requestor data, and a plurality of query data,
   a plurality of sender features and a plurality of requestor features,
   a data set comprising feature vectors labeled with a delay in processing the query data, the feature vector comprising a value for the plurality of sender features and the plurality of requestor features;
a memory coupled to a computer processor; and
a process delay predictor executing on the computer processor and using the memory to:
   receive an open query sent by a company to a requestor;
   extract the plurality of company data, the plurality of customer data, and the plurality of query data from the data repository using a programmable interface to access a software application;
   refine, using a set of algorithms, the plurality of sender data, the plurality of requestor data, and the plurality of query data into the plurality of sender features and the plurality of requestor features,
      wherein the plurality of sender features comprises an overall sender closed query history and a recent sender closed query history, wherein the recent sender closed query history comprises the closed queries related to the sender over a predetermined timespan, and
      wherein the plurality of requestor features comprises an overall requestor closed query history and a recent requestor closed query history over the predetermined timespan;
   predict a delay in processing the open query using a trained model analyzing the plurality of sender features and the plurality of requestor features,
      wherein the trained model individually considers the overall sender closed query history, the recent sender closed query history, the overall requestor closed query history, and the recent requestor closed query history; and
   update, at an expiration of the predetermined timespan, the application to add the delay to a due date of the open query based on the plurality of sender features; and
   update, at the expiration of the predetermined timespan, the application to add the delay in processing the open query based on the plurality of requestor features.

5. The system of claim 4, wherein the open query comprises at least one from a group consisting of a purchase order, service request, approval request, a request for proposal or report, a deposit request, a database query, a connection request, and an authentication request.

6. The system of claim 4, wherein the closed queries comprise at least one from a group consisting of a product delivery, a service performed, an approval received, a query result received, a connection established, and an authentication confirmed/denied.

7. The system of claim 4, wherein the trained model comprises the set of algorithms and is formed by adding, using the plurality of sender features and the plurality of requestor features, to a decision tree:
   internal nodes corresponding to a subset of the plurality of sender features and a subset of the plurality of requestor features,
   branches corresponding to values of the subset of the plurality of sender features and the subset of the plurality of requestor features, and
   leaf nodes, each corresponding to the delay in processing the open query.

8. The system of claim 7,
   wherein the plurality of recent features corresponding to the respective internal node is selected according to a plurality of feature relevance metrics assigned to the plurality of recent features,
   wherein the internal nodes are added to the decision tree until the satisfaction of a termination condition indicating that the feature relevance metric assigned to a recent feature is below a threshold value, and
   wherein the delay predictor is further configured to remove the recent feature corresponding to the respective internal node from the subset of the plurality of recent features after adding the respective internal node to the decision tree.

9. The system of claim 4, wherein the process delay predictor further executes to:
   obtain a training sequence of transactions, wherein the training sequence of transactions comprises historical data including the open query, the closed query, and the delay;
   generate a plurality of recent features based on a subsequence of transactions resulting at a completion of the training sequence of transactions;
   generate, using the plurality of recent features, a training data set comprising a plurality of feature vectors labeled with the delay of the closed query of one of the training sequence of transactions, wherein each feature vector comprises a value for each of the plurality of recent features; and
   generate a decision tree by calculating, using the training data set, a plurality of feature relevance metrics for the plurality of recent features.

10. The system of claim 4, further comprising:
   a graphical user interface (GUI) executing on the computer processor and using the memory to present, to the requestor, an alert regarding the delay in response to the delay exceeding a threshold.

11. A method comprising:
receiving an open query sent by a sender to a requestor;
extracting, using a programmable interface, a plurality of sender data, a plurality of requestor data, and a plurality of query data from an application and the open query;
refining, using a set of algorithms, the plurality of sender data, the plurality of requestor data, and the plurality of query data into a plurality of sender features and a plurality of requestor features,
   wherein the plurality of sender features comprises an overall sender closed query history and a recent sender closed query history, wherein the recent sender closed query history comprises the closed queries related to the sender over a predetermined timespan, and
   wherein the plurality of requestor features comprises an overall requestor closed query history and a recent requester closed query history over the predetermined timespan;
predicting a delay in processing the open query using a trained model analyzing the plurality of sender features and the plurality of requestor features,
   wherein the trained model individually considers the overall sender closed query history, the recent sender closed query history, the overall requestor closed query history, and the recent requestor closed query history;

updating, at an expiration of the predetermined timespan, the application to add the delay to a due date of the open query based on the plurality of sender features; and updating, at the expiration of the predetermined timespan, the application to add the delay in processing the open query based on the plurality of requestor features.

12. The method of claim 11, wherein the open query comprises at least one from a group consisting of a purchase order, service request, approval request, a request for proposal or report, a deposit request, a database query, a connection request, and an authentication request.

13. The method of claim 11, wherein the closed queries comprise at least one from a group consisting of a product delivery, a service performed, an approval received, a query result received, a connection established, and an authentication confirmed/denied.

14. The method of claim 11, further comprising:
generating a decision tree by adding, to the decision tree, using a plurality of feature relevance metrics for the plurality of recent features:
internal nodes corresponding to a subset of the plurality of recent features,
branches corresponding to the values of the subset of the plurality of recent features, and
leaf nodes, each corresponding to the delay of processing the open query; and
applying the decision tree to the plurality of recent features by traversing, through the decision tree, a path comprising a series of branches, each corresponding to a value of one of the plurality of recent features and a leaf node corresponding to the delay.

15. The method of claim 14,
wherein a recent feature corresponding to the respective internal node is selected according to a plurality of feature relevance metrics assigned to the plurality of recent features,
wherein the internal nodes are added to the decision tree until a termination condition indicating that the feature relevance metric assigned to a recent feature is below a threshold value, and
wherein removing the recent feature corresponding to the respective internal node from the subset of the plurality of recent features after adding the respective internal node to the decision tree.

16. The method of claim 11, further comprising:
obtaining transactions, wherein the transactions comprise historical data including the open query, a closed query, and the delay;
generating the plurality of recent features based on the transactions;
generating, using the plurality of recent features, a training data set comprising a plurality of feature vectors labeled with the delay of one of the transactions, wherein each feature vector comprises a value for the plurality of recent features; and
generating a decision tree by calculating, using the training data set, a plurality of feature relevance metrics for the plurality of recent features.

17. The method of claim 16, further comprising:
removing an anomalous transaction from transactions when the delay of the anomalous transaction exceeds a predetermined threshold.

18. The method of claim 11, further comprising:
connecting, via a programmable interface, a computing system of the requestor to the trained model, wherein the programmable interface allows access to the trained model without user interaction.

19. The method of claim 11, further comprising:
linking the computing system of the requestor to the trained model via a gateway, the gateway allowing secured information to be shared between the computing system of the requestor and the trained model.

20. The method of claim 11, further comprising:
in response to the delay exceeding a threshold, presenting to the requestor via a graphical user interface (GUI), an alert regarding the delay.

* * * * *